(12) United States Patent
Capozzella

(10) Patent No.: US 10,703,435 B2
(45) Date of Patent: Jul. 7, 2020

(54) CONTROL METHOD OF A POWERTRAIN UNIT OF AN ASSISTED PEDAL BICYCLE AND RELATED ASSISTED PEDAL BICYCLE

(71) Applicant: PIAGGIO & C. SPA, Pontedera (IT)

(72) Inventor: Paolo Capozzella, Pontedera (IT)

(73) Assignee: PIAGGIO & C. S.P.A., Pontedera (IT)

(*) Notice: Subject to any disclaimer, the term of this patent is extended or adjusted under 35 U.S.C. 154(b) by 220 days.

(21) Appl. No.: 15/774,786

(22) PCT Filed: Oct. 18, 2016

(86) PCT No.: PCT/IB2016/056249
§ 371 (c)(1),
(2) Date: May 9, 2018

(87) PCT Pub. No.: WO2017/081567
PCT Pub. Date: May 18, 2017

(65) Prior Publication Data
US 2018/0319456 A1 Nov. 8, 2018

(30) Foreign Application Priority Data
Nov. 13, 2015 (IT) .................. 102015000072570

(51) Int. Cl.
*B62M 6/50* (2010.01)
*B60L 15/02* (2006.01)
(Continued)

(52) U.S. Cl.
CPC ............ *B62M 6/50* (2013.01); *B60L 15/025* (2013.01); *B60L 50/20* (2019.02); *B60L 50/51* (2019.02);
(Continued)

(58) Field of Classification Search
None
See application file for complete search history.

(56) References Cited

U.S. PATENT DOCUMENTS 6,073,717 A * 6/2000 Yamamoto ............... B62M 6/45
180/206.4
6,342,769 B1 1/2002 Birkestrand
(Continued)

FOREIGN PATENT DOCUMENTS

EP 0795463 A1 9/1997
EP 1998435 A2 12/2008

OTHER PUBLICATIONS

International Search Report and Written Opinion for PCT/IB2016/056249 dated Jan. 27, 2017.

*Primary Examiner* — Richard M Camby
(74) *Attorney, Agent, or Firm* — Cantor Colburn LLP

(57) ABSTRACT

A control system and method for a powertrain unit of a pedal assisted electrical bicycle, the powertrain unit including an electrical motor, a DC/AC converter to supply the motor from a battery wherein the following steps are taken: starting the electrical machine in order to rotate the rotor; estimating a back electromotive force produced by the electrical machine; estimating the angular position of the rotor with respect to the stator winding starting from the estimation of the back electromotive force; controlling the DC/AC converter based on said estimated angular position in order to make it supply the stator winding so that said electrical machine delivers a torque.

7 Claims, 8 Drawing Sheets

(51) Int. Cl.
 *B62M 6/55* (2010.01)
 *B62M 6/45* (2010.01)
 *B60L 50/20* (2019.01)
 *B60L 50/51* (2019.01)
 *B60L 53/12* (2019.01)

(52) U.S. Cl.
 CPC .............. *B60L 53/12* (2019.02); *B62M 6/45* (2013.01); *B62M 6/55* (2013.01); *B60L 2200/12* (2013.01); *B60L 2210/40* (2013.01); *B60L 2240/42* (2013.01); *Y02T 10/643* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 9,088,237 B2 | 7/2015 | Sanchez | |
| 2004/0263099 A1* | 12/2004 | Maslov | B60L 58/40 318/400.24 |
| 2012/0083957 A1* | 4/2012 | Aoki | B62M 3/003 701/22 |

\* cited by examiner

CONTROL METHOD OF A POWERTRAIN UNIT OF AN ASSISTED PEDAL BICYCLE AND RELATED ASSISTED PEDAL BICYCLE

CROSS-REFERENCE TO RELATED APPLICATION

This application is the 35 U.S.C. § 371 national stage application of PCT Application No. PCT/IB2016/056249, filed Oct. 18, 2016, where the PCT claims priority to and the benefit of, IT Patent Application No. 102015000072570, filed Nov. 13, 2015, both of which are herein incorporated by reference in their entireties.

APPLICATION FIELD

The present invention concerns a control method of a powertrain unit for an assisted pedal bicycle, commonly named "EPAC" (Electric Pedal Assisted Cycle) and a related assisted pedal bicycle.

Particularly, it is a control method of a bicycle having a powertrain unit, which provides assistance to the pedaling being generated by the rider through the pedals when using the vehicle, according to suitable control schemes.

KNOWN ART

As it is known, the key factors for the success of that kind of bicycle solutions are compactness, lightness, ease of use, engaging aesthetic, reliability and a reduced cost as well. Nevertheless, the electrical assisted pedal bicycles still have some improvement margins. Actually, the powertrain unit of those bicycles generally includes a synchronous electrical machine with permanent magnets being supplied by a battery through an electronic DC/AC converter, named inverter. The above-mentioned synchronous electrical machine includes one rotor with permanent magnets and one stator including a three-phase stator winding being supplied by alternating currents. It is known that the proper operation of a synchronous motor with permanent magnets is linked to the exact knowledge of the position of the flux of the permanent magnets of the rotor, and therefore the position of the rotor, with respect to the phases of the supply currents of the stator winding. Therefore, the synchronous motor with permanent magnets needs an absolute position sensor (such as for example an absolute resolver or encoder).

The use of the above-mentioned position sensor implies two problems to be solved: housing the sensor on the rotor shaft and initially matching the signal provided by the sensor with the stator position.

Moreover, the presence of an additional component reduces the reliability level of the whole system, because any possible failure of the position sensor leads to the impossibility of controlling the electrical machine.

Therefore, there is the need to fully or partially solve the above-described problems referring to the known art. That need is fulfilled by a control method as defined in the claim 1 in its general form and in the dependent claims in particular embodiments.

DESCRIPTION OF THE DRAWINGS

Further characteristics and advantages of the present invention will be more understandable from the description being reported below of its preferred and non-limiting examples of embodiments, wherein.

The elements or parts of elements being in common among the embodiments that are described in the following will be indicated with the same reference numbers.

DETAILED DESCRIPTION

Figure 1:
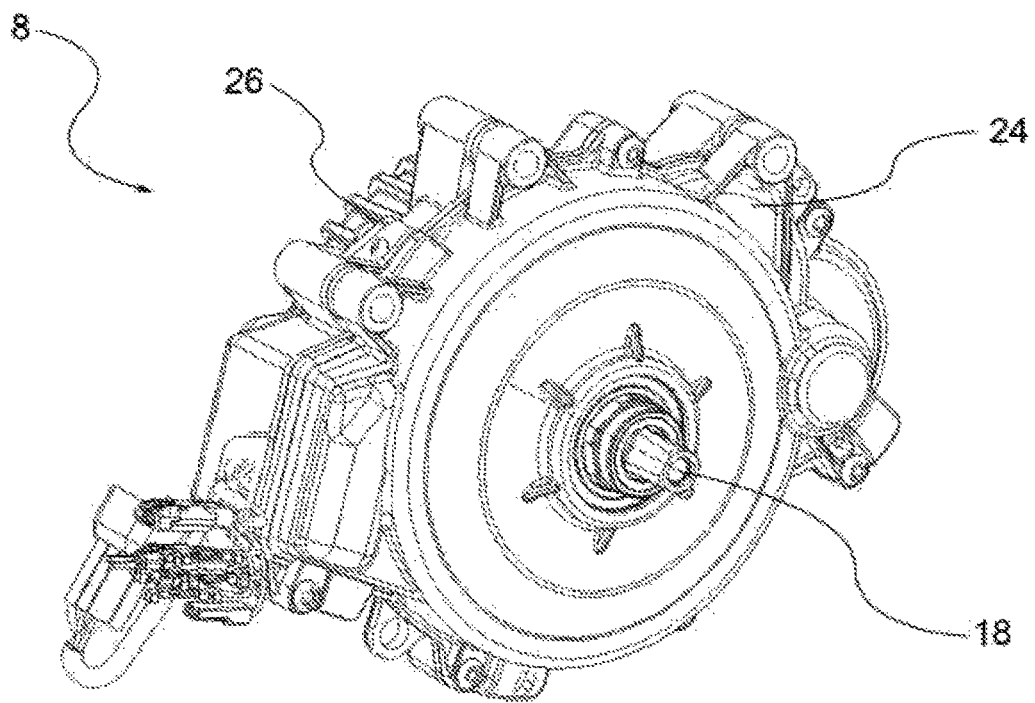
FIG. 1 represents a perspective view of a possible example of a powertrain unit being controllable by means of a control method according to the present invention.
Figure 2:
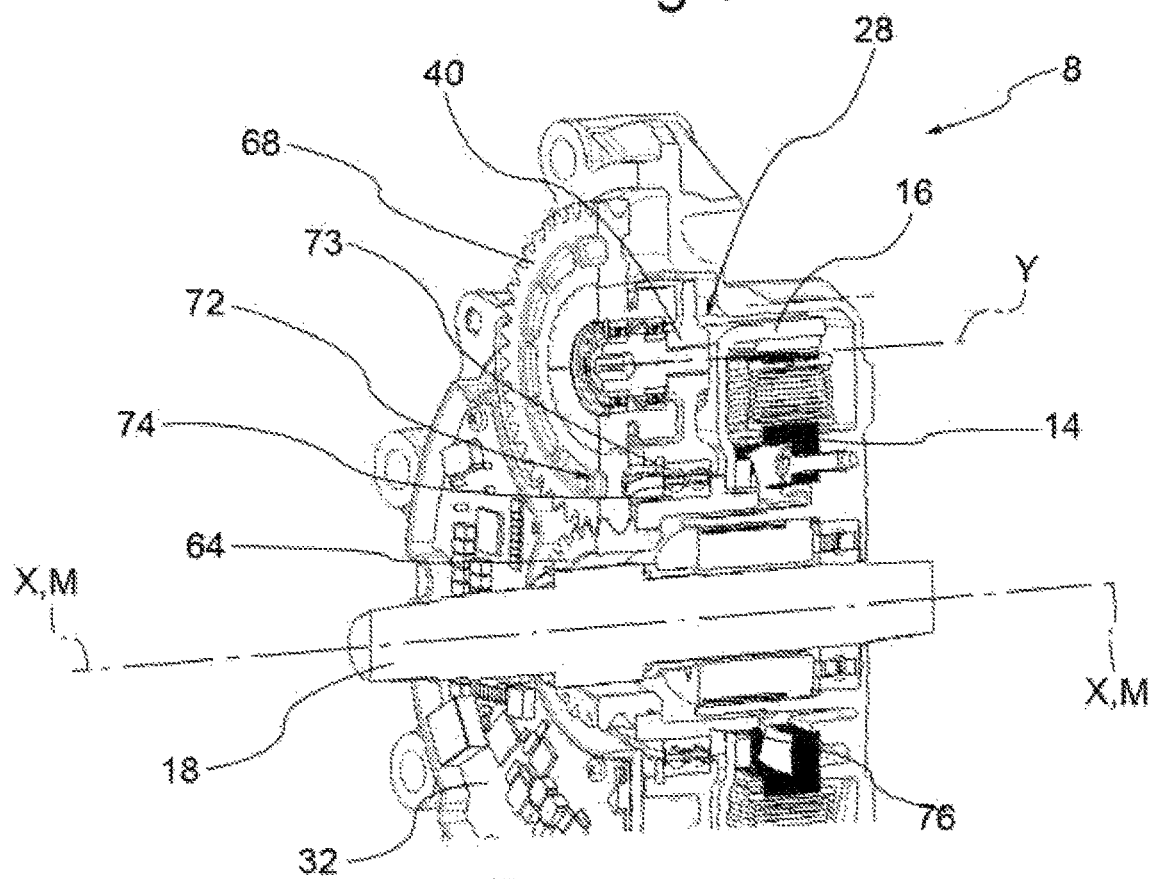
FIGS. 2-4 represent sectional views, taken from different angles, of the powertrain unit of FIG. 1.

Referring to the above-mentioned figures, with 4 it is globally indicated an overall schematic view of a bicycle including a powertrain unit 8 according to the present invention.

The present invention particularly refers to assisted pedal bicycles, usually called "EPAC" (Electric Pedal Assisted Cycle).

For the purpose of the present invention, the type of frame of the bicycle is insignificant, meaning also bicycles having more than two wheels, both front and back ones.

The powertrain unit 8 includes an electrical machine 12 having one stator 14 and one permanent magnets rotor 16, being rotatable about a driving axis M-M, said rotor 16 being operatively connected with a crank spindle 18, which defines a crank axis X-X, being mechanically connected with pedals 20. In the present description, reference will be made to the electrical machine 12 by naming it also with the term motor 12 or electrical motor 12.

The crank axis X-X preferably is coaxial to the driving axis M-M.

The stator 14 includes a three-phase stator winding being able to be supplied with three alternating currents $I\_u$, $I\_v$, $I\_w$ in order to cause the rotation of the rotor 16. Preferably, the stator winding is a star winding.

The rotor 16 preferably is coaxial and external with respect to the stator 14 in order to radially enclose the rotor 16; for radial direction, it is meant a direction being perpendicular to the crank axis X-X and incident therewith.

In that way, the rotor 16 encloses and radially surrounds the stator 14.

The powertrain unit 8 preferably includes at least one pair of carters 24, 26 defining a containing volume 28 housing the electrical machine 12 and at least partially the crank axis X-X.

Preferably, the carters 24, 26 are made of a thermally conductive material, such as for example a metal material.

The powertrain unit 8 includes at least one electronic board 32 for driving and managing the operation of the electrical machine 12. The electronic board 32 for example is leaning on a related supporting plate 34. The electronic board 32 includes a DC/AC converter 100 adapted to supply the electrical machine 12 and a control unit 101 of the DC/AC converter. For example, the DC/AC converter is such to provide the electrical machine 12 with three alternating currents $I\_u$, $I\_v$, $I\_w$. Preferably, the control unit 101 includes a microcontroller.

The powertrain unit 8 also includes motion transmission means 36 from the rotor 16 to the crank axis X-X. Preferably, said transmission means 36 as a whole are arranged in an asymmetrical and offset position with respect to the crank axis X-X, in order to protrude from the projection of the rotor 16 on a projection plane being perpendicular to the crank axis X-X.

Preferably, the electronic board 32 is contained and supported inside said containment volume 28 and more preferably, the electronic board 32 is placed in order to fall inside the projection of the rotor 16 on a projection plane perpendicular to the crank axis X-X.

According to one embodiment, the electronic board 32 as a whole is placed on the opposite side of the transmission means 36, with respect to the crank axis X-X. For example, the electronic board 32 as a whole is 'C' shaped and it is placed around the crank axis X-X.

According to one embodiment, the powertrain unit 8 includes a fixed type intermediate supporting element 40, which rotatably supports the rotor 16 and which fixedly supports the electronic board 32; the intermediate supporting element 40 also is contained inside the containment volume 28.

For example, the rotor 16 and the electronic board 32 are arranged on axially opposite sides with respect to said intermediate supporting element 40, along the crank axis X-X.

In this way, the intermediate supporting element 40 is not only a supporting element but also an axial separation element between the rotor 16 and the stator 14 of the electrical machine 12, from one side, and the electronic board 32 on the other side.

Said intermediate supporting element 40 preferably is arranged around the crank axis X-X and it is fixed with respect the same.

Preferably, the intermediate supporting element 40 receives and conveys the heat being generated by both the electrical machine 12 and the electronic board. That heat being received in a substantially axial direction by the intermediate supporting element 40 is outwardly radially dissipated by the latter, namely moving away from the crank axis X-X.

Actually, the intermediate supporting element 40 is contacting the at least one of said carter 24, 26 in order to radially dissipate the heat, through them, outside the powertrain unit 8.

Preferably, the intermediate supporting element 40 is made in a thermally conductive material, such as for example a metal material.

According to one embodiment, the powertrain unit 8 includes at least one cylindrical element 44 mechanically connecting the intermediate supporting element 40 with the electronic board 32, said cylindrical element 44 being a heat conductor that allows extracting and transferring the heat from the electronic board 36 to the intermediate supporting element 40 and from the latter outside the carters 24, 26.

According to one embodiment, at least one of said cylindrical elements 44 is provided with an oval cross-section with respect to a section plane being perpendicular to a main extension axis of the same element.

The oval cross-section is the one that, the overall dimensions being the same, ensures a higher heat exchange capacity when compared to, for example, a circular cross section.

According to one embodiment, the electronic board 32 is provided with at least one electrical cable 48 and at least one related cable grommet 52; the cable grommet 52 is fastened to the electronic board 32 by means of at least one fastening means 56, such as for example a screw.

The cable grommet 52 and/or the fastening means 56 are heat conductors in order to dissipate the heat coming from the electronic board itself.

As mentioned above, the powertrain unit 8 includes transmission means 36 to transmit the motion from the rotor 16 to the crank spindle 18. Preferably, the transmission means 36 are adapted to selectively take an engaged state wherein said means allow transmitting the motion from the rotor 16 to the crank spindle 18 or a disengaged state wherein said means prevent transmitting the motion from the rotor 16 to the crank spindle 18. For that purpose, the above-mentioned transmission means 36 comprise one or preferably two free wheels that will be described in greater detail later.

Now some possible embodiments of the transmission means will be described, it being understood that the control method that will be described in the following can be applied also to assisted pedal electrical bicycles 4 having transmission means being different from the specific transmission means 36 being described hereinafter.

According to one embodiment, the transmission means 36 comprise a first transmission stage 60 having a first input gear 64, being rotationally integral with the rotor and coaxial therewith, and a first output gear 68 being rotatable about a first axis Y-Y being offset and parallel with respect to the rotational axis X-X. The first input and output gears 64, 68 mesh.

According to one embodiment, the first input gear 64 is rotatably supported by the intermediate element.

For example, the intermediate supporting element 40 includes a bore 70 housing a bearing 72; the bearing 72 includes a first ring 73 being fixed and seated on the wall of the intermediate supporting element 40 delimiting the bore 70 and a second ring 74 being movable and rotationally integral with a portion of said first input gear 64. In this way, due to the interposition of the bearing 72, the intermediate supporting element 40 rotatably supports the first input gear; moreover, according to one embodiment, the first input gear 64 is rotationally integral with the rotor 16 thanks to a cup element 76. For example, the cup element 76 includes a ring on which the second ring 74 of the bearing 72 is interference fitted.

The powertrain unit 8 includes a second transmission stage 80 having a second input gear 84, being rotationally integral with the first output gear 68 and coaxial therewith, and a second output gear 88, meshing the second input gear 84 and being rotatable integrally with a second shaft 92 defining a second axis or return axis W-W being offset and parallel with respect to the rotational axis X-X and the first axis Y-Y.

For example, the second input gear 84 is coaxially connected with the first output gear 68 of the first transmission stage 60 by means of a splined profile.

Figure 3:
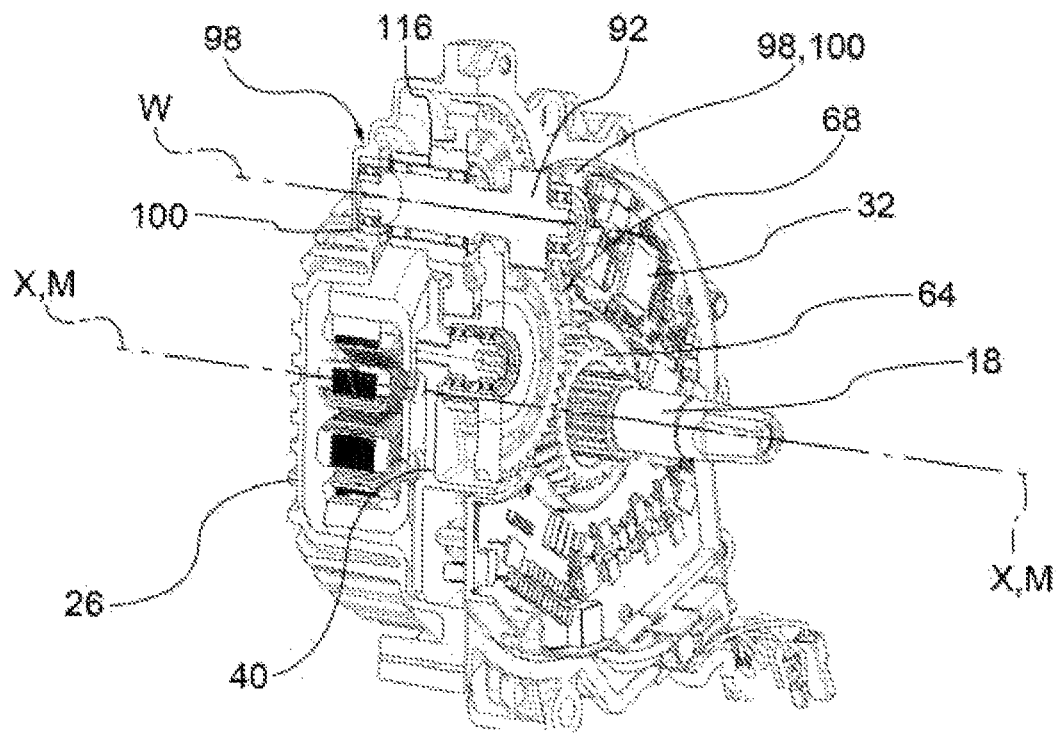
Figure 4:
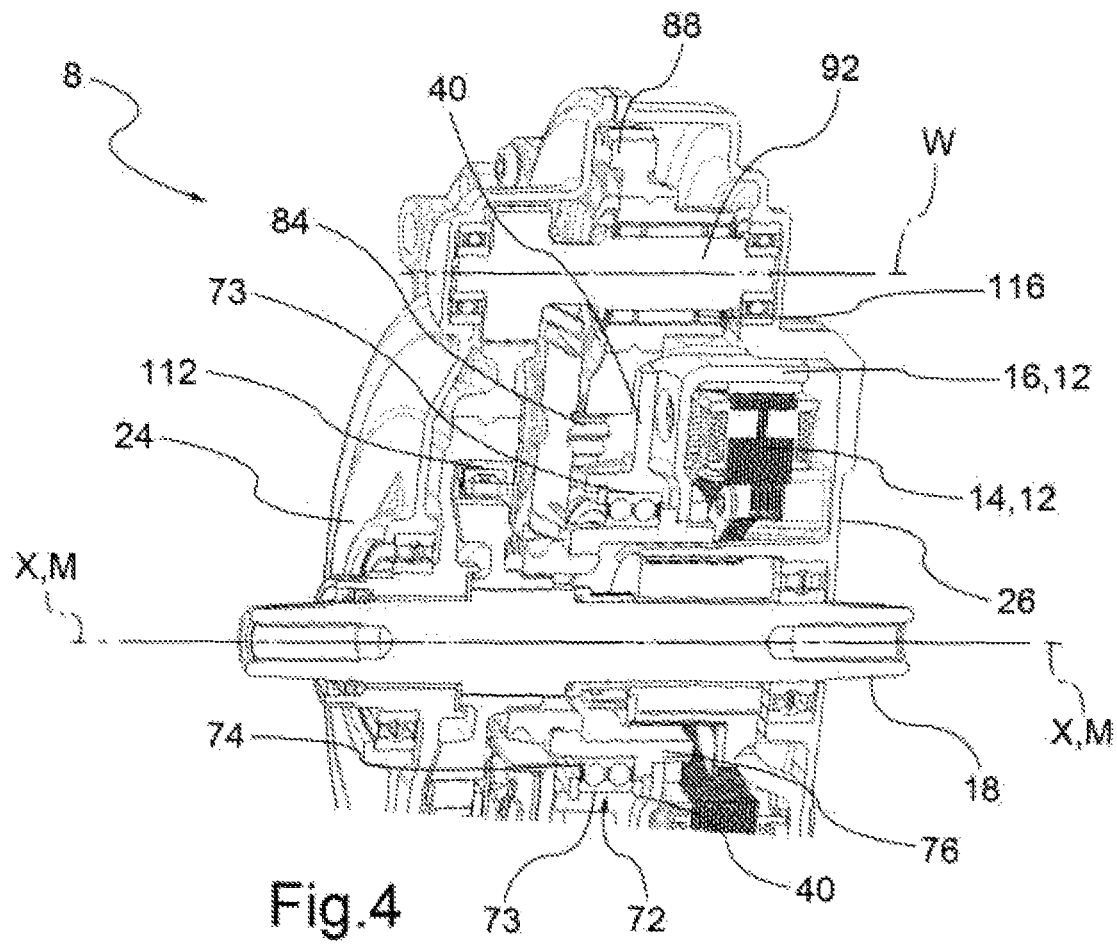
Figure 5:
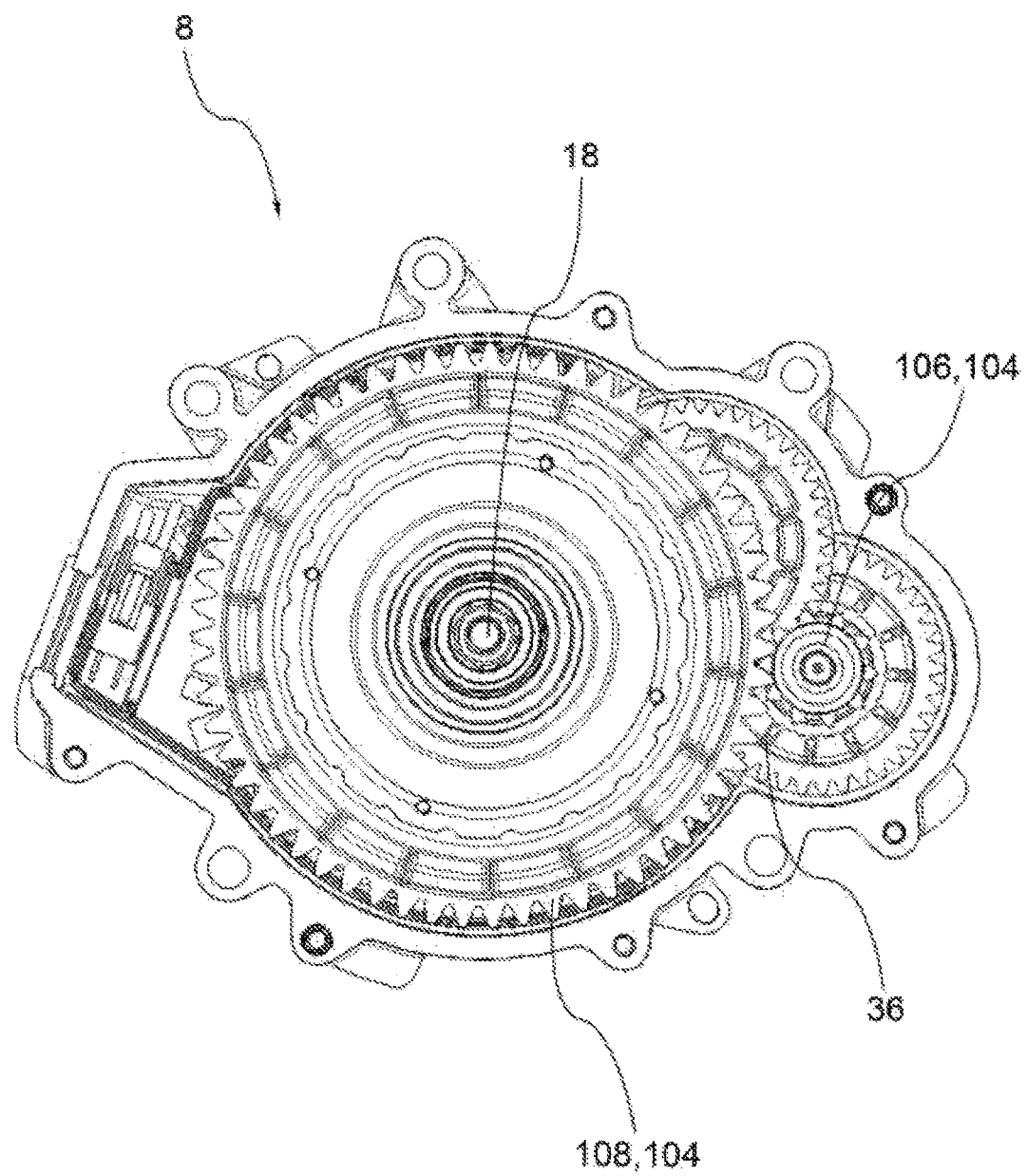
FIG. 5 represents a lateral view of a powertrain unit wherein a lateral cover or carter has been removed.
Figure 6:
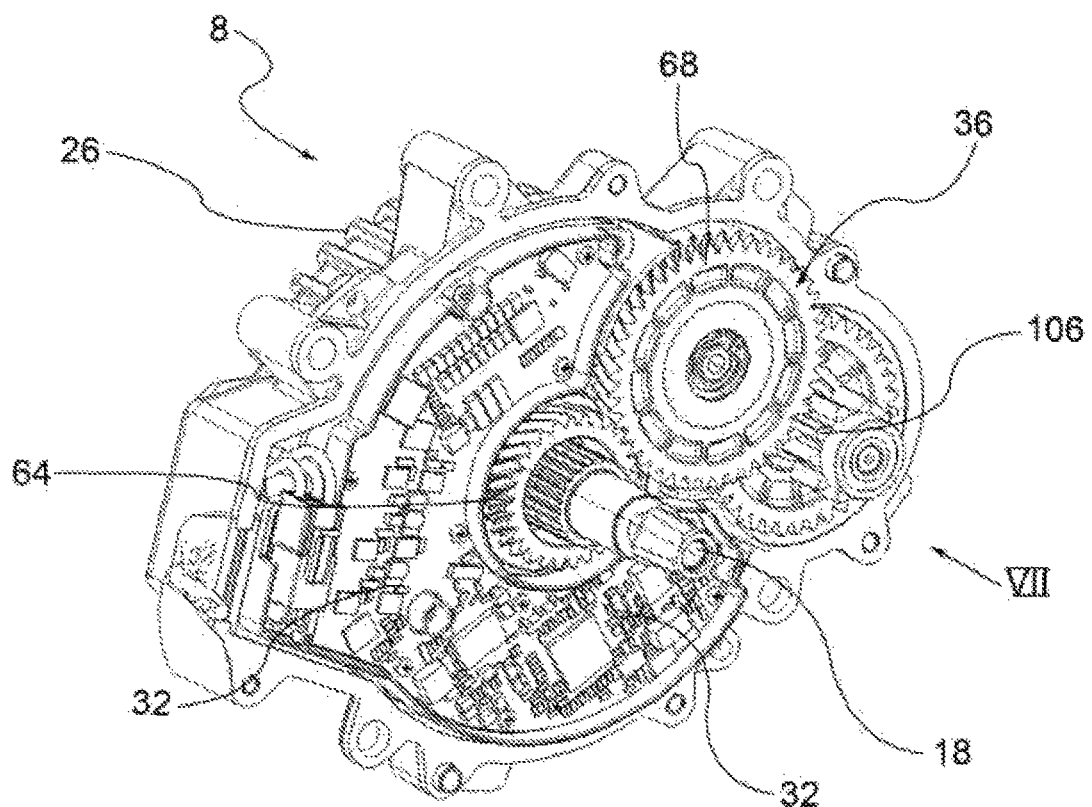
FIG. 6 represents a perspective view of a powertrain unit wherein a lateral cover, or carter, has been removed.
Figure 7:
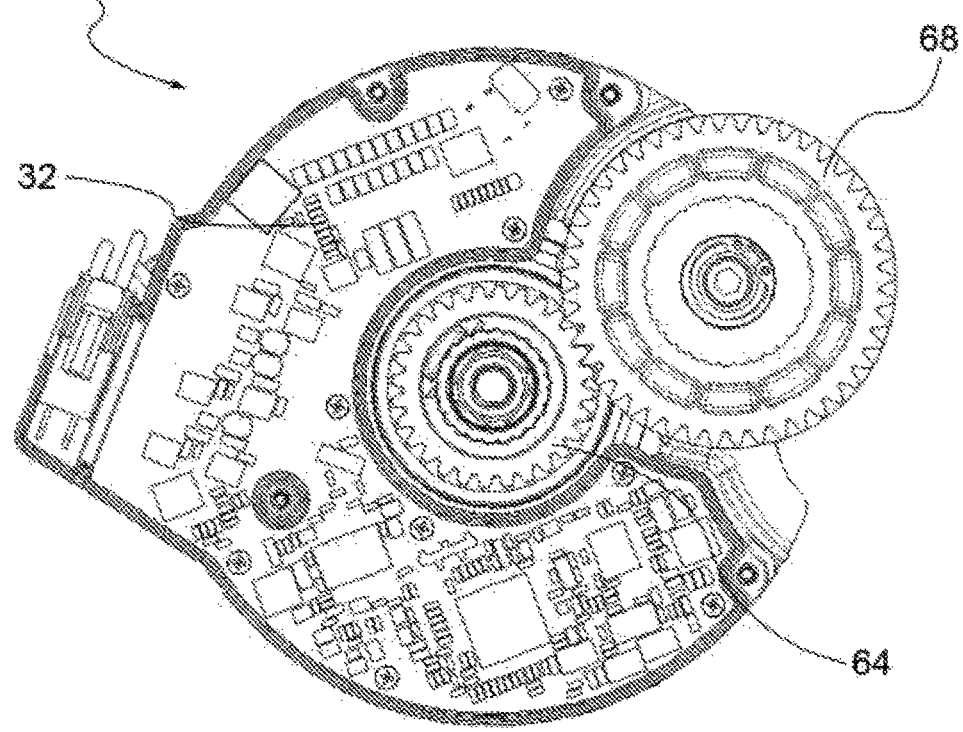
FIG. 7 represents a front view of the powertrain unit of FIG. 6, from the side of the arrow VII of FIG. 6.
Figure 8:
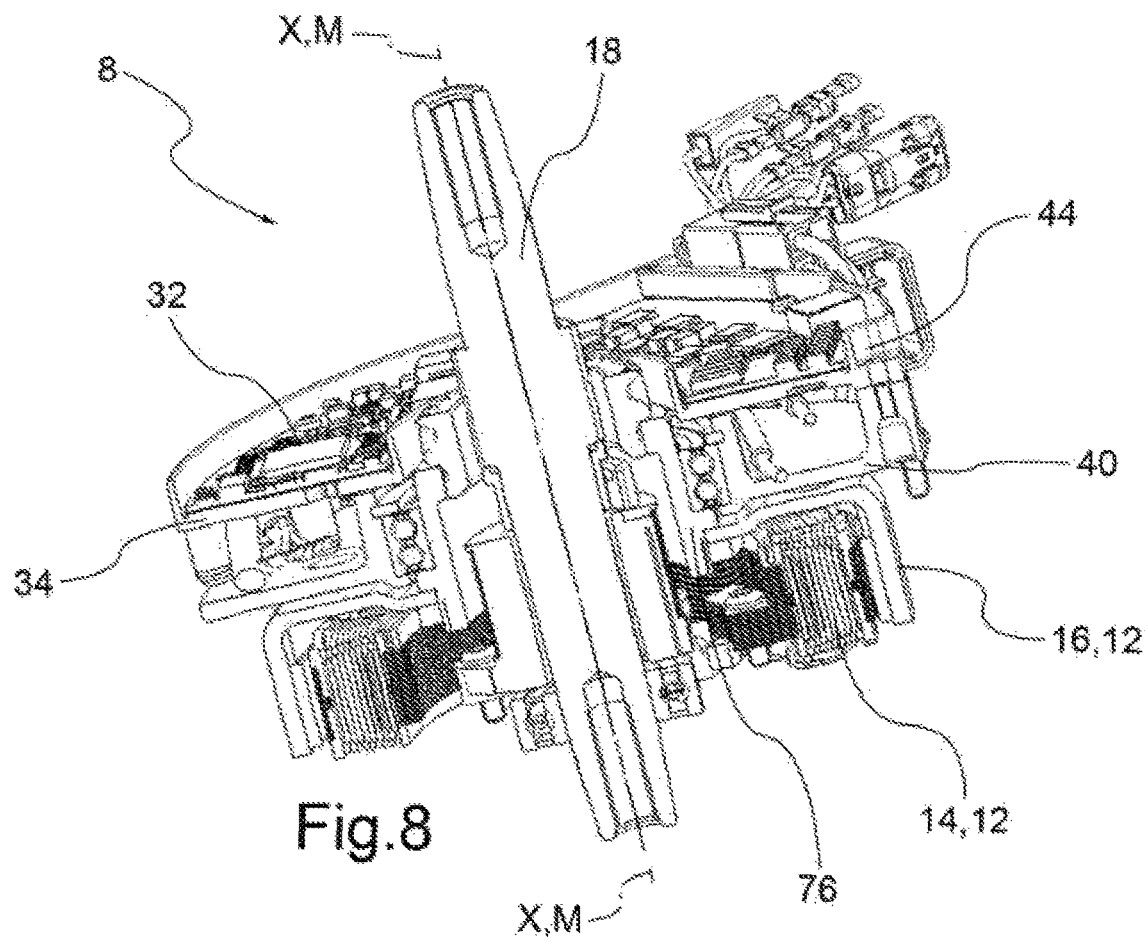
FIG. 8 represents a sectional perspective view of a powertrain unit according to the invention, wherein some elements have been omitted.
Figure 9:
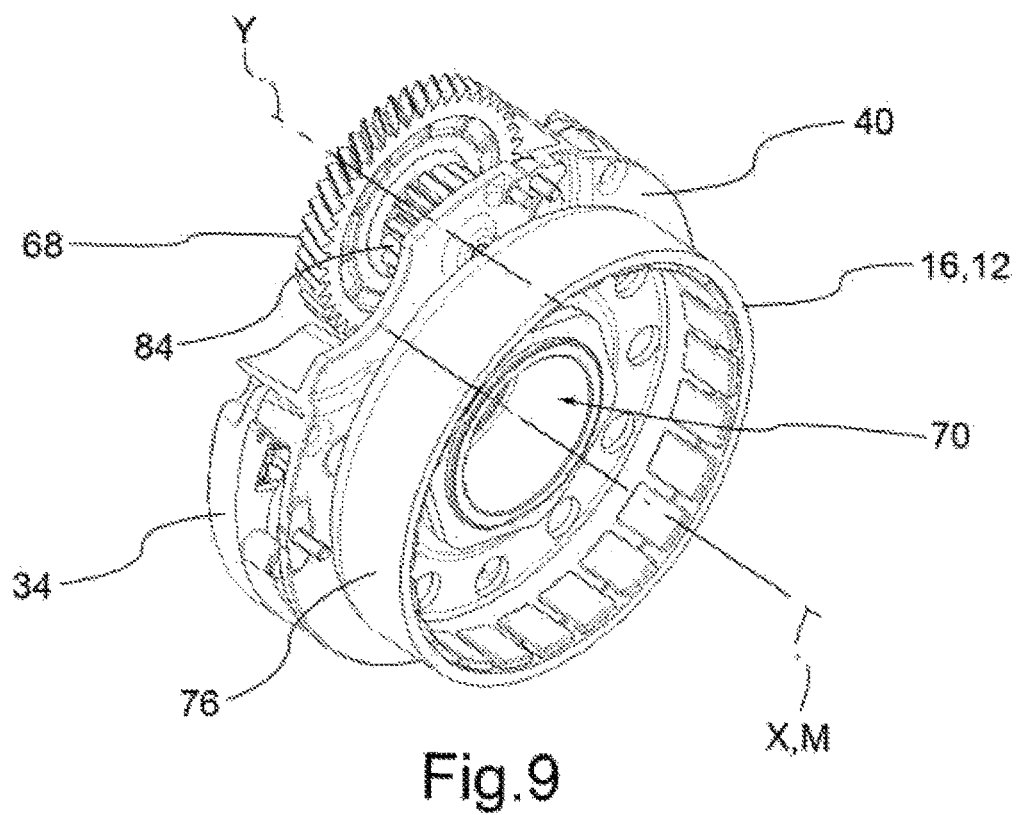
FIG. 9 represents a perspective view of a partially assembled powertrain unit of the present invention.
Figure 10:
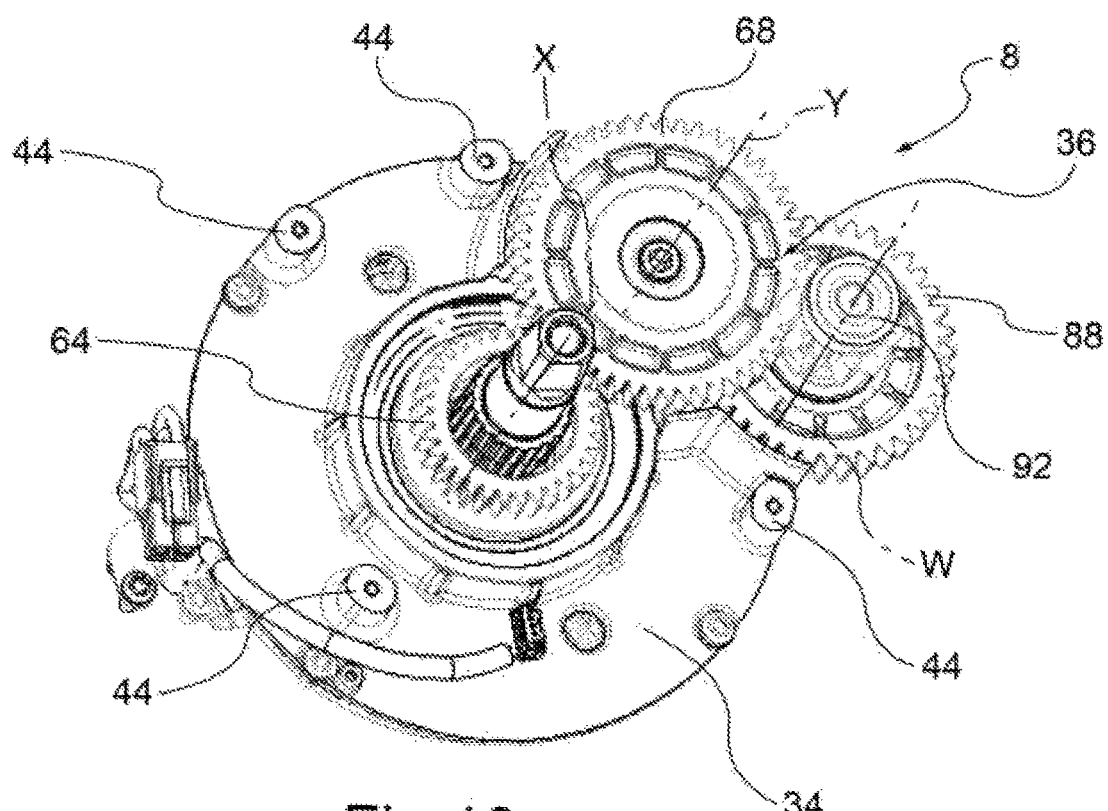
FIGS. 10-12 represent perspective views of components of the powertrain unit according to the present invention.
Figure 11:
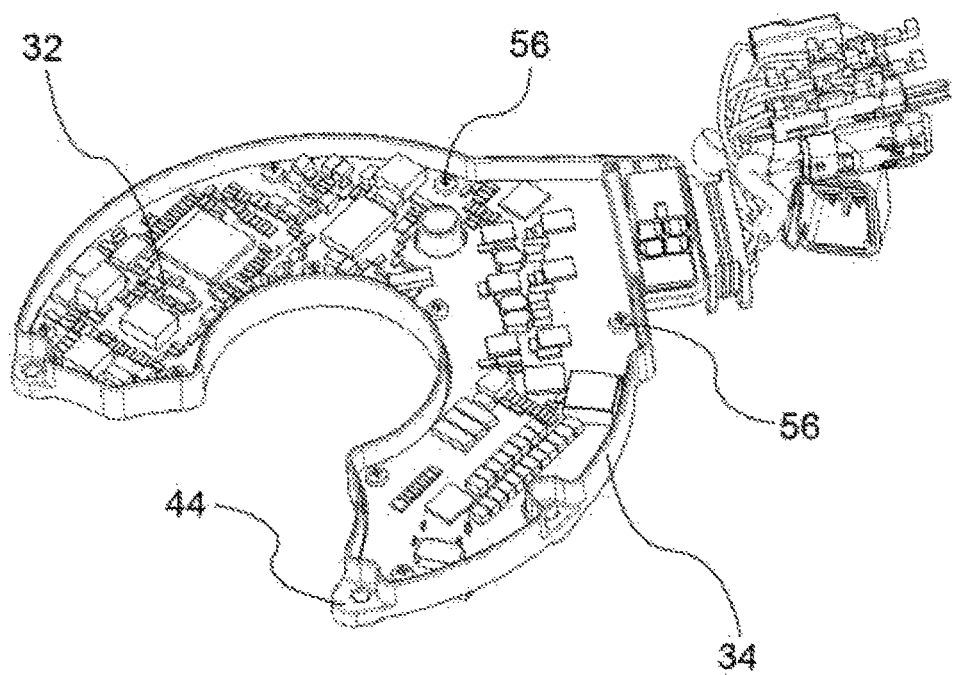
Figure 12:
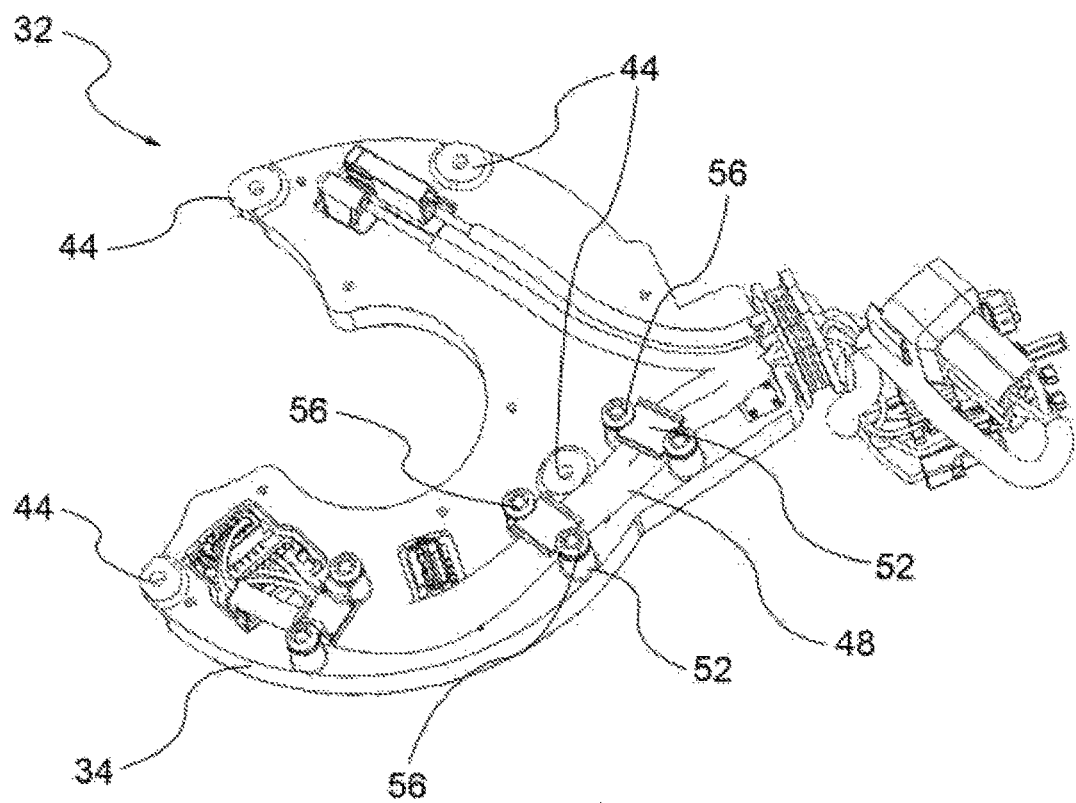
Figure 13:
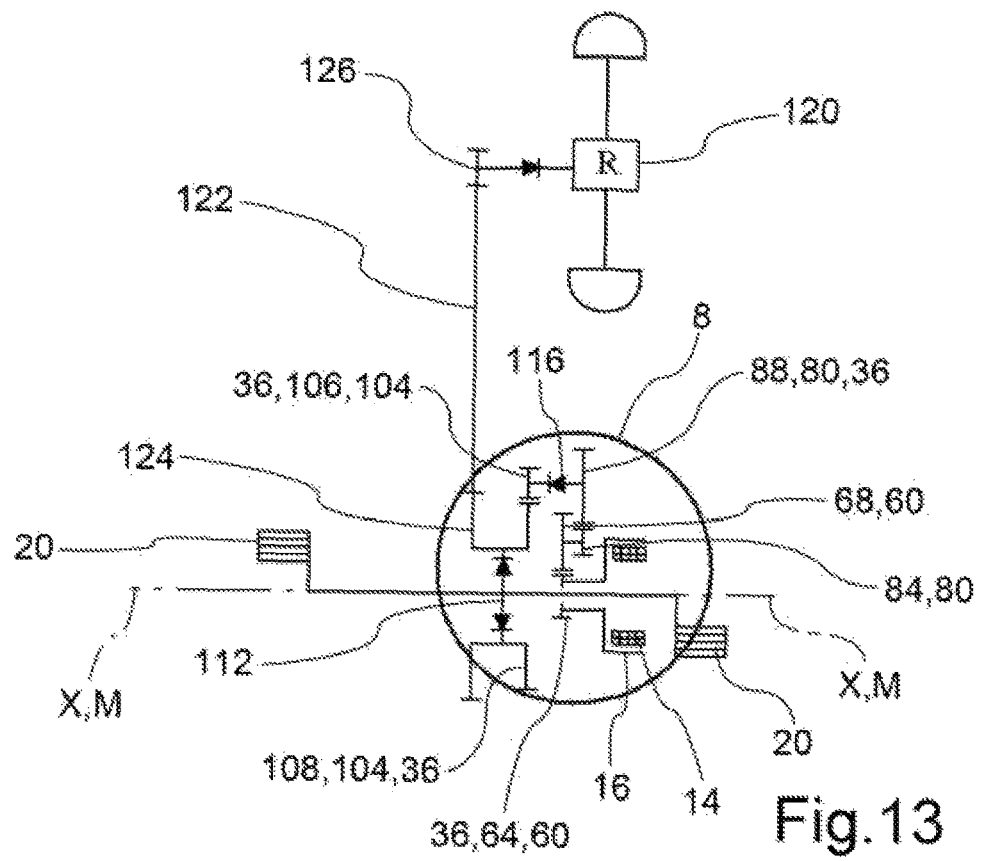
FIG. 13 represents a schematic view of the kinematic transmission of the powertrain unit according to the present invention, being applied to a bicycle.
Figure 14:
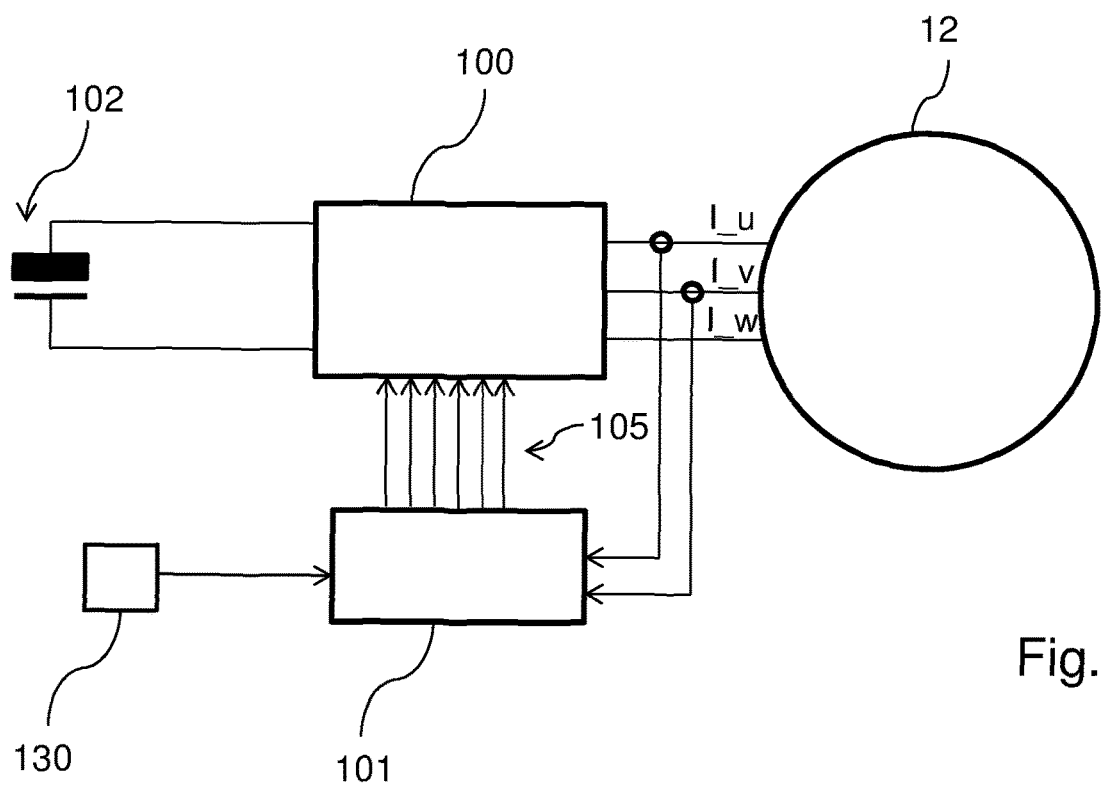
FIG. 14 represents a view of a functional flow chart of a control system by means of which a control method of the powertrain unit can be implemented.
Figure 15:
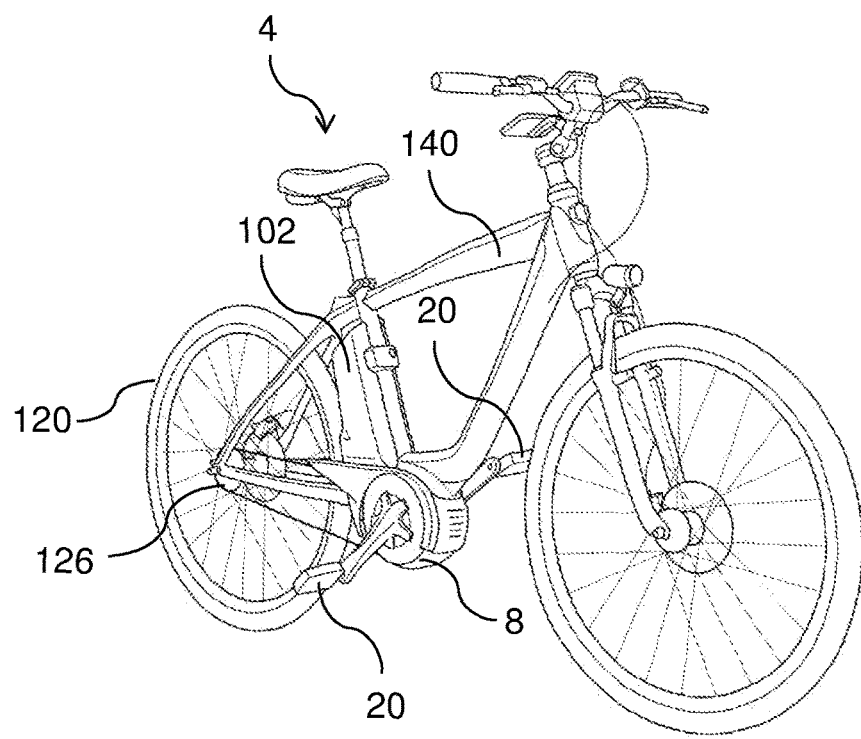
FIG. 15 shows a possible embodiment of a bicycle including the powertrain unit of FIG. 1.

For example, the carters 24, 26 define seats 98 housing supporting bearings 100 for said second shaft 92 (FIG. 3).

The powertrain unit 8 includes a third transmission stage 104 having a third input gear 106, being rotationally integral with the second output gear 88 and coaxial therewith, and a third output gear 108 mashing with the third input gear 106 and transmitting power to the rotational axis or crank axis X-X realizing the pedaling aid.

Preferably, the transmission means 36 comprise a first free wheel 116 being assembled between the second shaft 92 and the second output gear 88, in order to decouple the torque transmission to the second output gear 88 to avoid the user rotationally dragging the mechanisms of the powertrain unit 8 when the latter is not providing pedaling assistance and/or to allow the rotor freely rotating with respect to the crank spindle 18 when the electrical machine 12 is supplied and when the powertrain unit 8 does not provide pedaling assistance.

For example, the first free wheel 116 is configured in order to make the second output gear 88 integral with the second shaft 92 when the rotational velocity of the third transmission stage 104 is greater than or equal to the one of the second shaft 92.

For example, the first free wheel 116 is configured so that, if the rotational velocity of the second shaft 92 is greater than the one of the second output gear 88, the first free wheel 116 makes the overrunning possible, thanks to the disengagement of cylinders, therefore avoiding the rider having to rotate also the powertrain unit 5.

The transmission means 36 preferably comprise a second free wheel 112 being assembled between the third output gear 108 and the crank spindle 18, coaxial with the crank axis X-X, in order to avoid dragging the powertrain unit when the crank, namely the pedals 20, are counter rotated (pedaling opposed with respect to the forward direction).

In this way, it is avoided that the user meets a resistance due to dragging the powertrain unit 8 during counter pedaling.

As seen, the powertrain unit 8 according to the present invention is assembled on a bicycle 4; the crank spindle 18 is cinematically connected with a driving wheel 120 of the bicycle 4, for example by means of a chain transmission.

Moreover, once defined a forward direction F of the bicycle 4, the powertrain unit 8 preferably is associated and oriented with respect to a frame 140 of the bicycle 4 so that the electronic board 32 is arranged at least partially on the forward direction F side.

In this way, the portion of the carter 24, 26 surrounding the electronic board 32 is directly and completely hit by the front air flow the vehicle runs into when moving, optimizing the cooling of the electronic board 32 and thus of the powertrain unit 8.

Now, the operation of a powertrain unit 8 for bicycles according to the present invention will be described. Particularly, the electronic board 32 and particularly the electronic control unit 101 activates the electrical machine 12 based on the intended logic, by detecting the boundary conditions, in order to provide the assisting power that adds to the one generated by the rider thanks to the pedaling. The control logic managing the pedal assistance, without being specific, depends on the operative variables detected from time to time by suitable sensors realized on the EPAC, such as for example, slope, speed, needed torque, etc. and on any law restriction related to the category which the vehicle belongs to (usually they can concern the maximum speed beyond which the aid intervention must end and the maximum assisting power of the electrical motor).

When the intervention conditions are reached, the electrical machine 12 activates. Namely, also in this case without entering in details, according to a suitable logic, the currents I_u, I_w, I_w are supplied to the stator winding of the stator 14.

Because of those currents passing in the stator winding, the rotor 16 rotates actually carrying out the aid to the pedaling, namely by supplying torque and therefore power to the crank spindle 18. The electrical energy required to run the whole system is contained in the form of chemical energy inside a battery pack 102, being mounted onboard the bicycle 4.

Passing to the details of the mechanical operation, when moving, the rotor 16 rotates the first input gear 64 being mounted thereto, which, together with the first output gear 68, forms the pair of gears of the first transmission stage 60.

The second input gear 84, being coaxially connected with the first output gear 68, for example by means of a splined profile, transmits the motion to the second output gear 88.

The second input gear 84 and the first output gear integrally rotate about the first axis Y-Y being offset and parallel with respect to the rotational axis X-X or crank axis.

The second output gear 88 is mounted on the second shaft 92 that therefore rotates as well.

Through the second shaft 92, the third input gear 106 of the third transmission stage 104 is rotated, which together with the third output gear 108 forms the pair of the third transmission stage 104.

Finally, the third output gear 108 transmits the power to the crank axis X-X realizing the pedaling aid.

As already described, in the powertrain unit 8 preferably there are two free wheels 116, 112.

Particularly, the powertrain unit 8 includes a first free wheel 116 being assembled between the second shaft 92 and the second output gear 88, in order to decouple the torque transmission to the second output gear 88 to avoid that the user rotationally drags the mechanisms of the powertrain unit 8 when the latter does not provide a pedaling assistance.

For example, the first free wheel 116 is configured in order to make the second output gear 88 integral with the second shaft 92 when the rotational velocity of the third transmission stage 104 is greater than or equal to the one of the second shaft 92.

For example, the first free wheel 116 is configured so that, if the rotational velocity of the second shaft 92 is greater than the one of the second output gear 88, the first free wheel 116 makes the overrunning possible, thanks to the disengagement of cylinders, therefore avoiding the rider having to rotate also the powertrain unit 8.

In this way, if the user's forward action is such to guarantee a rotational velocity of the pedals being greater than the one imposed by the powertrain unit 8, automatically the first free wheel 116 disengages the powertrain unit 8, which otherwise would act as a brake for the driving action imparted by the user. On the contrary, if the action being imparted on the pedals 20 by the user is such to generate a rotational velocity of the pedals being lower than the one imposed by the powertrain unit 8, than the first free wheel 116 allows transmitting the torque from the powertrain unit 8 to the pedals 20. In such a situation, it is the user that provides a lower torque/power than the one generated by the powertrain unit 8; in any case, the torque imparted by the user on the pedals 20 is never disengaged but is always transmitted to the crank spindle 18 and, for example by means of a chain transmission 122, to the driving wheel 120. In other words, the torque action provided by the user is added, on the crank spindle 18, to the torque action supplied by the powertrain unit 8 that acts as a helping element for the user action.

The chain transmission 122 can include one crown 124 rotationally integral to the crank spindle 18 and a pinion 126: the crown 124 and the pinion 126 are provided with teeth in order to suitably mash on the chain links of the chain transmission 122.

As seen, the second free wheel 112 is assembled between the third output gear 108 and the crank spindle 18, coaxial with the crank axis X-X, in order to avoid dragging the powertrain unit 8 when the crank, namely the pedals 20, are counter rotated (pedaling opposed with respect to the forward direction) and to avoid the electrical motor can rotate the crank spindle 18.

In this way, it is avoided that the user meets resistance due to dragging the powertrain unit 8 during counter pedaling and during the phases when the electrical motor produces such a traction torque not to exert any dragging torque on the crank spindle 18.

The free wheel function can be obtained by means of various technical solutions, for example by using pawls, and preferably, it is assembled to be coaxial to the crank axis X-X. Thanks to the pawls action, the crank spindle 18 can overrun the third output gear 108, which therefore stays disengaged: thus, it is avoided dragging the powertrain unit 8 in case of counter pedaling.

Now, some embodiments of a control method for a powertrain unit 8 of an electrical assisted pedal bicycle 4 EPAC of the above-described type will be described, given that such a method can be applied also to a powertrain unit of a different type.

As already said, generally the powertrain unit 8 includes:
an electrical machine 12 having one stator 14 and one rotor 16 with permanent magnets, being rotatable about a driving axis M-M, the stator 14 including a three-phase stator winding that can be supplied to cause the rotation of the rotor 16;
a DC/AC converter 100 being controllable to supply the stator winding;
a crank spindle 18, defining a crank axis X-X and a pair of pedals 20 mechanically fastened to the crank spindle 18;
transmission means 36 being adapted to transmit the motion from the rotor 16 to the crank spindle 18.

The control method is such that the electronic control unit 101 is able to control the DC/AC converter 100 without requiring position sensors mounted inside the electrical machine 12.

In one general embodiment, the control method includes the steps of:
a) starting the electrical machine 12 in order to rotate the rotor;
b) estimating a back electromotive force produced by the electrical machine 12;
c) estimating an angular position of the rotor 16 with respect the stator winding starting from the estimation of the back electromotive force;
d) controlling the DC/AC converter 100 based on said estimated angular position so that it supplies the stator winding for the electrical machine 12 to deliver a torque.

For the purpose of executing the above-mentioned steps b), c) and d), the above-mentioned method for example can be performed according to the sensorless vector control described in the paper "*Implementation and Sensorless vector control Design and Tuning Strategy for SMPM Machines in Fan-Type Applications*", Parag Kshirsagar et Al., IEE 2006, pages 2062-2069 being entirely incorporated by reference herein in connection with the control method sensorless based on the estimation of the back electromotive force.

According to the above-mentioned paper, the above-mentioned control method could be applied to an electrical machine 12 in a high rotational velocity condition, while according to that paper the method could not be applied starting form a condition where the electrical machine 12 is still or almost still. However, the Applicant observed that it is possible to advantageously exploit a transient period between a control condition where the electrical machine 12 does not provide assistance to the pedaling and a control condition where assistance to the pedaling is required, to start the electrical machine 12 as indicated in step a) for example according to operative parameters being preset during the design and execute steps b) c) and d) in a condition where the rotor is free to rotate and is disengaged from the crank spindle 18. For that purpose, in one particularly advantageous embodiment, as described above, the transmission means 36 of the powertrain unit 8 are adapted to selectively assume an engaged state where said means allow transmitting the motion from the rotor 16 to the crank spindle 18 or a disengaged state where said means prevent transmitting the motion from the rotor to the crank spindle 18 and the method moreover includes an initial synchronization step where the above-described steps b), c) and d) are sequentially executed one or more times after starting the electrical machine 12 in the step a) in a condition where said transmission means 36 are in the disengaged state.

According to one embodiment, the initial synchronization step is performed to make the electrical machine 12 deliver a first constant torque value and where at the end of said initial synchronization step, when said means assume the engaged state, said steps b), c) and d) are performed in order the make the electrical machine deliver torque values higher than said first torque value. For that reason, the peak-to-peak amplitude values of the alternating currents I_u, I_v and I_w in the synchronization step are less than the peak-to-peak amplitude values being provided at the end of said synchronization step when the transmission means are actually in the engaged state and the electrical motor 12 delivers a torque adding up to the one generated by the rider thanks to the pedaling.

According to one advantageous embodiment, the control method also includes the steps of:
measuring a rotational velocity and/or frequency of the crank spindle 18 due to the pedaling;
comparing said measured velocity and/or frequency with a threshold value;
and the initial synchronization step is started when the measured velocity and/or frequency is greater than or equal to said threshold value.

For example, the velocity and/or frequency can be measured through a pedaling sensor 130, for example being provided with at least a magnet and at least a Hall sensor, connected to the electronic control unit 101.

Preferably, the above-described steps b), c), d) are performed according to a closed loop control algorithm based on an asymptotic linear observer to estimate said back electromotive force in the step b) and on a following controller to obtain an estimation of angular velocity and angular position of the rotor in said step c). More preferably, the following controller is a phase locked loop that minimizes an error in the estimation of position and velocity in a d-q reference system.

According to one advantageous embodiment, in the initial synchronization step, the above-described step d) is performed by controlling the DC/AC converter 100 for example by means of a PWM control signal provided through the control lines 105 so that it supplies the stator winding with alternating currents I_u, I_v, I_w having a constant peak-to-peak amplitude and a frequency higher than or equal to a threshold frequency value. In other words, during the synchronization step, the DC/AC converter is controlled so that the frequency imposed to the supply currents does not drop below said threshold frequency value.

Clearly, the above-described operation, in turn, it is subject, particularly at the end of the synchronization step, to the operation/intervention logics of the electrical machine 12 being implemented by the electronic board 32 based on a plurality of operative parameters.

As it is possible to observe from what described, the above-described method allows overcoming the drawbacks being presented in the known art.

One skilled in the art, with the purpose of fulfilling contingent and specific needs, will be able to make several modifications and variations to the above-described powertrain unit, however all contained in the scope of the invention as defined by the following claims.

The invention claimed is:

1. An assisted pedal electrical bicycle including an electronic control unit, being adapted and configured to carry out a control method of a powertrain unit of a pedal assisted electrical bicycle, wherein the powertrain unit includes an electrical machine having a stator and a permanent magnet rotor, being rotatable around a driving axis, the stator including a three-phase stator winding adapted to be supplied in order to cause the rotation of the rotor, a DC/AC converter controllable in order to supply the stator winding, a crank spindle, defining a crank axis and a pair of pedals mechanically fastened to the crank spindle, transmission means adapted to transmit the movement from the rotor to the crank spindle;

the control method including the steps of a) starting the electrical machine in order to rotate the rotor, b) estimating a back electromotive force produced by the electrical machine, c) estimating the angular position of the rotor with respect to the stator winding starting from the estimation of the back electromotive force, and d) controlling the DC/AC converter based on said estimated angular position in order to make it supply the stator winding so that said electrical machine delivers a torque;

wherein the electronic control unit is adapted and configured to carry out the control method wherein said transmission means include at least one free wheel (112, 116) in order to be adapted to selectively take the engaged state or the disengaged state and where in the control method said transmission means are adapted to selectively take an engaged state wherein said means allow transmitting the movement from the rotor to the crank spindle or a disengaged state wherein said means prevent transmitting the movement from the rotor to the crank spindle and wherein the control method also includes an initial synchronization step wherein the steps b), c) and d) are carried out sequentially one or more times after starting the electrical machine in the step a), in a condition where said transmission means are in the disengaged state.

2. The control method according to claim 1, wherein said transmission means are adapted to selectively take an engaged state wherein said means allow transmitting the movement from the rotor to the crank spindle or a disengaged state wherein said means prevent transmitting the movement from the rotor to the crank spindle and wherein the control method also includes an initial synchronization step wherein the steps b), c) and d) are carried out sequentially one or more times after starting the electrical machine in the step a), in a condition where said transmission means are in the disengaged state.

3. The control method according to claim 2, wherein the initial synchronization step is carried out so that the electrical machine delivers a first constant torque value and wherein after said initial synchronization step, when said means take the engaged state, said steps b), c) and d) are carried out so that the electrical machine delivers torque values being greater than said first torque value.

4. The control method according to claim 2, also including the steps of:
   measuring a rotational velocity and/or frequency of the crank spindle due to the pedaling;
   comparing said measured velocity and/or frequency to a threshold value;
   and wherein said initial synchronization step is started when the measured velocity and/or frequency is greater than or equal to said threshold value.

5. The control method according to claim 1, wherein said steps b), c), d) are carried out according to a closed loop control algorithm based on a linear asymptotical state observer to estimate said back electromotive force in the step b) and on a tracking controller to obtain an estimate of the rotor angular velocity and angular position in said step c).

6. The control method according to claim 5, wherein the tracking controller is a phase locked loop such to minimize an error in the position and velocity estimate in a d-q reference system.

7. The control method according to claim 1, wherein in the initial synchronization step said step d) is carried out by controlling the DC/AC converter so that it supplies the stator winding with alternating currents having a constant peak-to-peak amplitude and a frequency not less than a threshold value.

* * * * *